Feb. 27, 1940.                R. C. LEWIS                 2,191,570
                              ANIMAL TRAP
                          Filed April 29, 1939          2 Sheets-Sheet 1
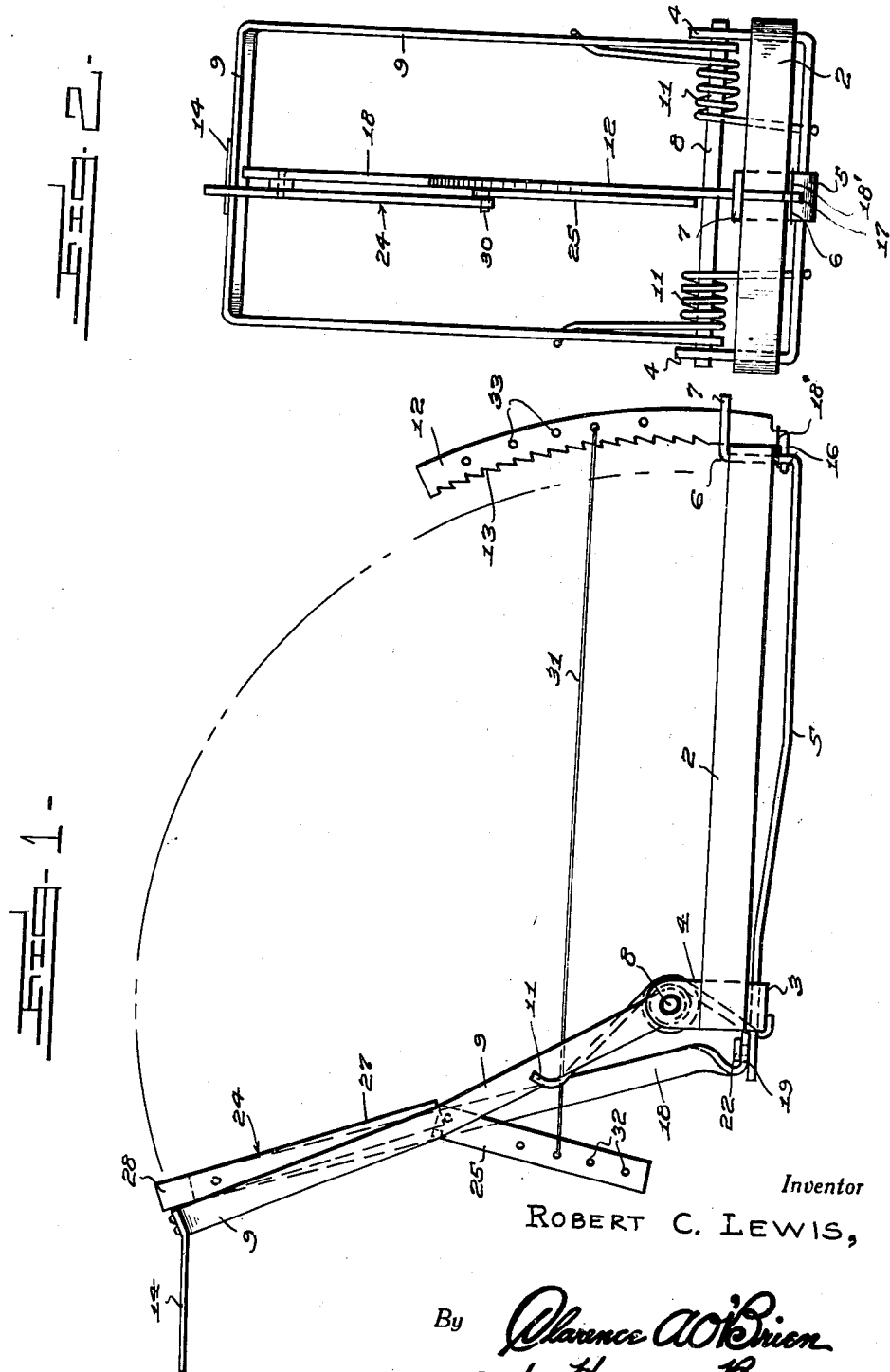
Inventor
ROBERT C. LEWIS,
By Clarence A. O'Brien
and Hyman Berman
Attorneys Feb. 27, 1940.   R. C. LEWIS   2,191,570
ANIMAL TRAP
Filed April 29, 1939   2 Sheets-Sheet 2
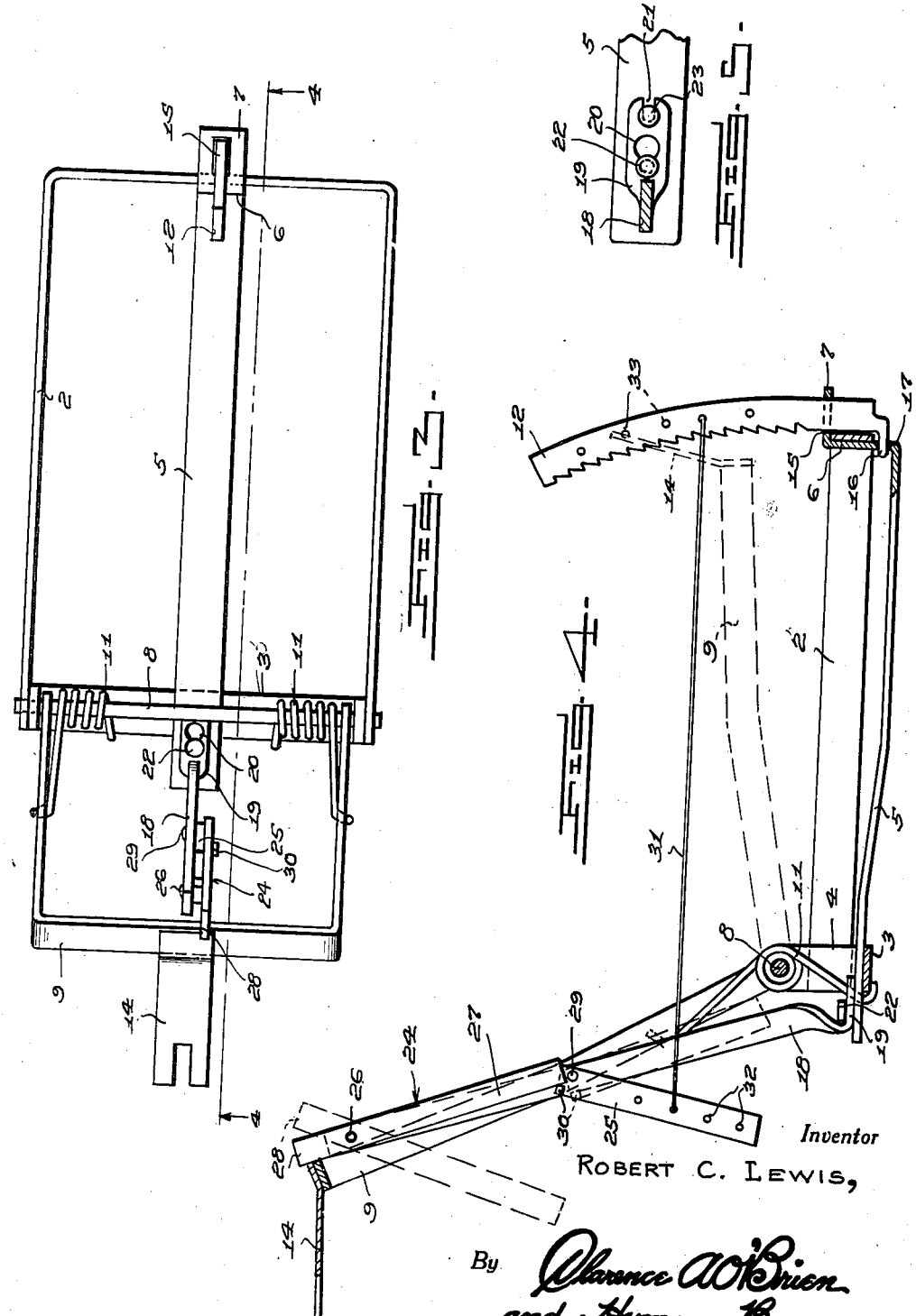
Inventor
ROBERT C. LEWIS,
By Clarence A. O'Brien
and Hyman Berman
Attorneys Patented Feb. 27, 1940

2,191,570

UNITED STATES PATENT OFFICE 2,191,570

ANIMAL TRAP

Robert C. Lewis, Minneapolis, Minn.

Application April 29, 1939, Serial No. 270,821

1 Claim. (Cl. 43—81)

My invention relates to improvements in traps for small animals such as muskrats, beavers, skunks, and the like.

The invention is designed with the particular purpose in view of providing a quick-acting trap operative to kill and entrap animals substantially instantaneously so as to lessen their suffering and which will not easily become fouled, as by debris, accumulating thereon, is escape-proof and can be easily taken apart and set up as occasion may require.

Another object is to provide a trap adapted to lock when sprung to prevent the trapped animal from escaping and which does not depend for operation on tripping by the weight of the animal, thereby obviating the use of the unreliable treadle-operated trips of animal traps of commerce.

To the accomplishment of the foregoing, and subordinate objects presently appearing, a preferred embodiment of my invention has been illustrated in the accompanying drawings, treated in detail in the succeeding description and defined in the claim appended hereto.

In said drawings:

Figure 1 is a view in side elevation of the preferred embodiment of my improved trap, the trap being set, Figure 2 is a view in rear end elevation, Figure 3 is a view in top plan, Figure 4 is a view in longitudinal section taken on the line 4—4 of Figure 3 looking in the direction indicated by the arrows, and Figure 5 is a fragmentary view in top plan of the means for mounting the post on the base bar.

Referring to the drawings by numerals, in the illustrated embodiment thereof the trap of my invention comprises an elongated substantially U-shaped, stationary jaw member 2 of flat, bar-like metal designed to lie edgewise on the ground and having rear terminal ends connected together by a flat cross-bar 3 terminating in a pair of suitably apertured, upstanding ears 4 secured, as by welding, not shown, to the inner sides of said terminals of the member 2 and being disposed flat side downward slightly below said member.

In the longitudinal center of the stationary jaw member 2 is a base bar 5 also of flat metal having a rear end overlying and resting on the top of the cross-bar 3 and a right-angled upstanding front end 6 fitting flush against the inner face of the front closed end of said member 2 and hooking over said end thereby providing an ear 7 extending outwardly of the member 2. The end 6 of the base bar 5 is detachably secured to the jaw member 2 as presently described. Intermediate the cross-bar 3 and the closed front end of the jaw member 2, base bar 5 is disposed below said member 2 to support the latter in slightly elevated position.

A transverse pivot rod 8 is mounted at its opposite ends in ears 4 and preferably fixed therein in any suitable manner.

The rod 8 provides an axis member for a vertically swingable jaw member 9 of substantially the same form as the jaw member 2 but having its terminal ends rotatably mounted on said rod 8 intermediate the ears 4 and being of slightly smaller size than said member 2 to fit into the latter.

The jaw members 2 and 9 are designed for coaction to grip an animal therebetween as will be understood and for this purpose a pair of strong coil springs 11 are provided for urging the swingable jaw member 9 downwardly towards the jaw member 2, said springs being sleeved on the rod 8 adjacent opposite ends thereof and intermediate the terminal ends of said member 9, each spring having its opposite ends bearing against the cross bar and one edge of said member 9 in a manner such that the springs oppose upward swinging of said member.

The trap is equipped with locking means as follows: At the closed front end of the stationary jaw member 2, in the longitudinal center of the latter, is an upstanding detent bar 12 curved concentrically with the axis of the movement of the swingable jaw member 9 and having a ratchet-toothed edge 13 facing said member 9. The outer closed end of the swingable jaw member 9 has extending therefrom, centrally thereof, a holding dog 14 in the form of a bifurcated plate-like member of resilient metal projecting obliquely from said end of the member 9 so as to straddle and wipingly engage the toothed edge 13 of detent bar 12 under downward swinging of said member 9, the arrangement being such that said dog interlocks with said toothed edge in different positions of member 9 to block upward swinging of said member from such positions, while at the same time said dog may be disengaged from said edge by manually pressing the dog away from the edge. The detent bar 12 forms a key-part of means for detachably securing the base bar 5 to the jaw member 2, the lower end of said bar 12 being removably inserted through a slot 15 in the beforementioned ear 7 to extend downwardly in front of said member 2 and having a right-angled end stud 16 for extension inwardly beneath said member 2 into an aperture 17 provided in the end 6 of bar 5. The lower end of detent bar 12 is detachably secured in position by means of wire wound around said end and bar as at 18'.

A trigger mechanism is provided for releasably holding the swingable jaw member 9 in upwardly swung set position in which it inclines slightly outwardly from its associated end of the stationary jaw member 2.

The trigger mechanism is mounted on an upright bar-like post 18 detachably mounted, as presently described, on the rear end of the base bar 5 slightly in the rear of the axis of movement of the swingable jaw member 9 and inclining slightly outwardly for a purpose presently seen. The mounting for the post 18 comprises a base lug 19 thereon having a key-hole slot 20 and an edge notch 21 therein receiving headed studs 22, 23, respectively, on the base bar 5. Post 18 is of the requisite height to permit the jaw member 9 to swing thereover. The trigger mechanism comprises a pair of upper and lower vertically disposed trigger bars 24, 25 respectively. The upper trigger bar 24 is pivotally mounted, as at 26, intermediate its ends on the upper end of the post 18 to swing in opposite directions longitudinally of the trap and to provide a long lower lever arm 27 and a short upper lever arm 28, the latter adapted to be interposed in front of the closed end of the swingable jaw member 9 to latch said member in set position. Obviously the jaw member 9 tends to swing the upper trigger bar about its axis into a releasing position in which said member is freed. The lower trigger bar 25 is pivotally mounted, as at 29, at one corner to the post 18 immediately below the lower terminal of trigger bar 24 to swing similarly to trigger bar 24 and is provided at the adjacent opposite corner thereof with a lateral lug 30 arranged so that under the swinging of said bar 24 in one direction it is revolved about the axis of said bar upwardly into blocking relation to the lower lever arm 27 of trigger bar 24 and thereby prevents swinging of said bar 24 into releasing position. The tendency of the trigger bar 24 to swing to releasing position under the urge of the jaw member 9 causes the lower lever arm 27 thereof to bear against said lug 30 and thereby hold the lower trigger bar 25 in a cocked position. Obviously movement of said bar 25 in the opposite direction from cocked position trips the upper trigger bar 24 for swinging to released position by said jaw member 9 thereby permitting the springs 11 to swing said member downwardly to sprung position against an animal traversing the jaw member 2.

For moving the trigger bar 25 from cocked position, a cord, or wire, 31 is secured at its opposite ends to said bar and to the detent bar 12, said cord extending taut over the jaw member 2 longitudinally thereof so that an animal crossing said member 2 encounters the cord and thereby causes the same to pull on the trigger bar 25 so as to swing the latter into a tripping position represented by broken lines in Figure 4. As soon as such action of the trigger bar 25 occurs the upper trigger bar 24 is swung by the jaw member 9 to releasing position illustrated in broken lines in Figure 4. Thereupon, the jaw member 9 is swung by the springs 11 downwardly into the broken line position also shown in said figure or into approximately such a position as will be understood.

Longitudinally spaced apertures 32, 33 are provided in the trigger bar 25 and detent bar 12 for securing the cord 31 to said bars at different levels.

By removing the wire 18, the detent bar 12 may be manipulated to withdraw the stud 16 from the aperture 17 and to lift the same out of the slot 15 thus detaching the same from the base bar 5. Base bar 5 is thus detached from the jaw member 2 together with the post 18 and trigger bars 24, 25. By sliding the base lug 19 of post 18 in the proper direction said lug may be detached from the base bar 5 together with trigger bars 24, 25. Thus the trap may be taken apart to provide four units only for arrangement into a compact flat bundle for shipment or carrying.

The foregoing will, it is believed, suffice to impart a clear understanding of the construction, operation and advantages of my invention and further explanation is therefore deemed to be unnecessary.

Manifestly the invention, as described, is susceptible of modification without departing from the inventive concept and right is herein reserved to such modifications as fall within the scope of the subjoined claim.

What I claim is:

In an animal trap, a stationary jaw member, a movable jaw member pivotally mounted on the stationary jaw member for vertical swinging movement into upright set position, spring means urging said movable jaw member downwardly into clamping relation to the stationary jaw member, trigger mechanism mounted on the stationary jaw member for latching the movable jaw member in set position and operative to release said last member, and means to operate said trigger mechanism comprising a pull cord extending across said stationary jaw member above the same and having one end secured to said mechanism and its opposite end anchored to said stationary member.

ROBERT C. LEWIS.